June 2, 1959 C. R. BORDERS 2,889,456
BLOCKING OSCILLATOR HAVING SHARP PULSE CUT-OFF
Filed July 22, 1955

INVENTOR.
CHARLES R. BORDERS
BY Paul M Enlow
AGENT 2,889,456

BLOCKING OSCILLATOR HAVING SHARP PULSE CUT-OFF

Charles R. Borders, Alpine, N.J., assignor to International Business Machines Corporation, New York, N.Y., a corporation of New York Application July 22, 1955, Serial No. 523,664

1 Claim. (Cl. 250—27)

This invention relates to electronic pulse circuits and more particularly to an electronic circuit adapted to render a sharply defined output pulse.

Frequently, in electronic pulse circuitry, such as pulse generator and pulse shaping circuits, the output pulses produced by such a circuit are taken from the cathode circuit of an electron discharge device. This occurs, for example, where the output terminal is connected to the cathode of an electron tube. For example, in a blocking oscillator, the output may be taken from the cathode of the oscillator tube. It is well known in the art of blocking oscillators that one of the purposes thereof is to produce a relatively narrow and sharply defined output pulse. It will be indicated below that one of the purposes of this invention is to provide a blocking oscillator which will supply pulses to a heavily reactive load and yet at the same time, provide a relatively narrow output pulse.

Associated with the output terminal of such a circuit is a given shunting capacitance $C_s$ which includes circuit stray and wiring capacities and the input capacitance of all circuits connected to said output terminal.

The leading edge of each output pulse charges the shunt capacitance $C_s$. After the termination of each output pulse, the shunt capacitance $C_s$ begins to discharge through the D.C. resistance path in parallel therewith. Where the output terminal is connected to the cathode of an electron tube this D.C. resistance path would most probably be the cathode load resistance of the tube.

The time required for the shunt capacitance $C_s$ to completely discharge depends upon the time constant of the resistance path and $C_s$. If this time constant is long compared to the inherent fall time of the output pulse, the trailing edge of this pulse will assume the periphery of the waveform appearing across the shunt capacitance.

As a result of the relatively slow discharge of the shunt capacitance, the width of the output pulse is increased. In addition, the fall time of the trailing edge of the output pulse is increased such that it no longer appears steep. It is well known that the proper operation of many types of pulse circuits requires that the trailing edge of each pulse applied thereto has a steep slope. Hence, it is desirable that the shunt capacitance associated with the output terminal of a particular pulse circuit be made as low as possible. However, where pulses of extremely short duration are being used, it is frequently impossible to reduce the shunt capacitance to a sufficiently low value. Whenever this situation occurs, the disadvantages arising from the presence of the shunt capacitance must be overcome by other means.

The prior art contains many pulse generators, pulse shaping circuits and pulse stretching circuits which make use of a transmission line to determine the width of the output pulse. However, in these circuits no consideration has been given to the shunt capacity associated with the output terminal of the circuit for the reason that such circuits generally utilize the transmission line to increase the width of the pulse. The present invention includes a blocking oscillator, the width of the output pulse of which is decreased to a relatively small time interval through the use of a shorted transmission line.

Accordingly, it is a principal object of this invention to provide a novel circuit arrangement for causing the shunt capacitance of a circuit to be discharged at the termination of a pulse so as to obtain a pulse having a sharp trailing edge.

Another object is to provide a novel blocking oscillator wherein each output pulse is of predetermined width.

A still further object is to provide a novel blocking oscillator employing an artificial transmission line or a real shorted line as a cathode load impedance wherein the pulse applied to said transmission line is effective to discharge any capacitive load associated with the output terminal of said oscillator.

Another object is to provide a novel circuit arrangement wherein a shorted transmission line serves as the cathode load impedance of an electron discharge device.

A further object is to provide means in the cathode circuit of an electron discharge device for substantially decreasing the fall time of the trailing edge of a pulse produced by said device.

Other objects of the invention will be pointed out in the following description and claim and illustrated in the accompanying drawings, which disclose, by way of example, the principle of the invention and the best mode, which has been contemplated, of applying that principle.

Figure 1:
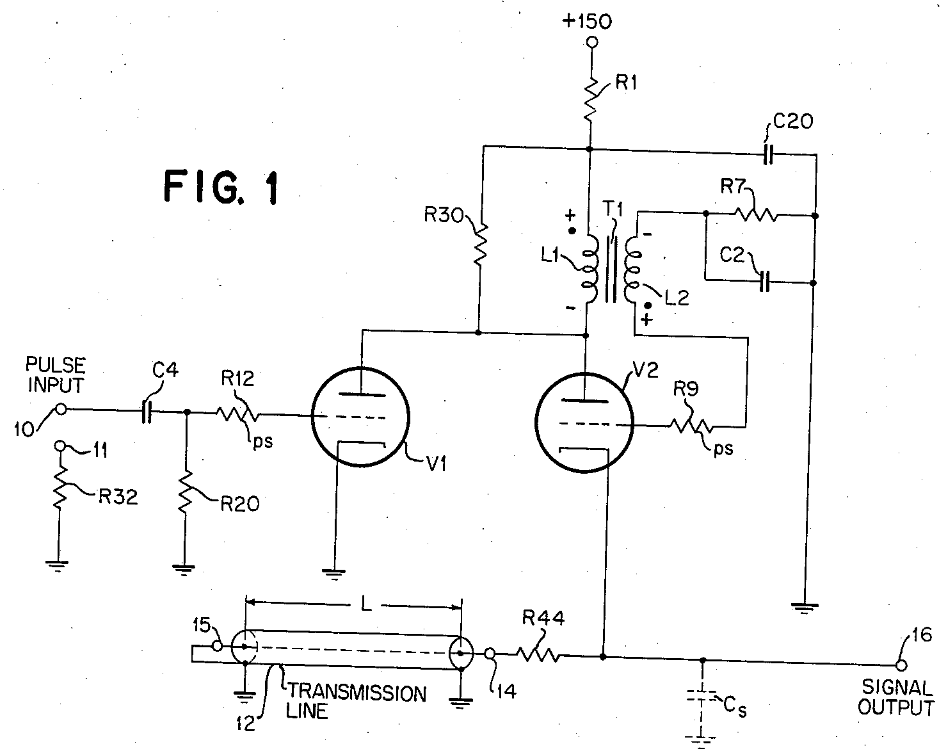
Fig. 1 is a circuit diagram of an electronic blocking oscillator illustrating one embodiment of the invention.

Referring to the drawing and more particularly to Fig. 1, the first embodiment of the invention includes a trigger tube V1 and a triode V2 which serve as a blocking oscillator and a cathode follower. Tubes V1 and V2 and the associated circuitry comprise a novel blocking oscillator which renders an output pulse in response to each input pulse.

A train of positive input pulses is applied to the input terminals 10 and 11. Each positive pulse applied to these terminals charges capacitor C4 which is connected to terminal 10 and in series through resistor R20 to ground. The juncture between C4 and R20 is connected through the parasitic suppressing resistor R12 to the control grid of V1. During the time interval intermediate adjacent input pulses, capacitor C4 discharges through resistor R20 so as to develop a negative bias voltage across said resistor. The voltage drop appearing across resistor R20 biases the control grid of V1 negative with respect to its cathode so that this tube is normally cut off. The application of each input pulse to terminals 10 and 11 recharges capacitor C4 whereby the negative potential normally appearing across resistor R20 becomes a positive potential so that tube V1 is momentarily rendered conductive.

The cathode of tube V1 is connected to ground and the plate thereof is connected through the parallel combination of resistor R30 and winding L1 of transformer T1, which are in series with resistor R1 to the +150 volt terminal. The plate of this tube is also connected to the plate of tube V2. The juncture of resistors R30 and R1 is connected to ground through capacitor C20. Resistor R1 and capacitor C20 serve as a filtering network which tends to remove transient signals which may be applied to the +150 volt terminal by a suitable power supply. Resistor R1 and capacitor C20 also serve to prevent sharp current from being drawn from the supply, which could interfere with other circuits connected to the same supply.

The control grid of tube V2 is connected through parasitic suppressing resistor R9 and winding L2 of transformer T1 to a common juncture of resistor R7 and capacitor C2. Capacitor C2 and resistor R7 are connected in parallel between one end of winding L2 and ground.

When tube V1 is rendered conductive by an input pulse, it draws plate current from the +150 volt terminal through resistor R1 and the parallel combination of L1 and R30. As the current starts to flow through winding L1, a magnetic field is set up in transformer T1 such that the end of this winding adjacent to the dot has a positive polarity. The dots associated with transformer T1 indicate that the windings are so situated that the "dot end" of the windings will have the same polarity. Thus when current initially begins to flow through winding L1 due to the action of tube V1, the magnetic field which is building up in the transformer induces a potential in winding L2 such that the lower end, that is, the dot end thereof is positive. This magnetic field builds up from zero to a maximum in direct proportion to the plate current of V1 and therefore induces a voltage in L2. The voltage in L2 is applied to the control grid of V2 so that this tube begins to draw current. As tube V2 draws plate current, the magnetic field in the transformer continues to build up until such time as the plate current of tube V2 reaches its maximum value. During the time that a voltage appears across winding L2, capacitor C2 is charged so that the plate thereof connected to ground obtains a positive polarity, with respect to its other plate.

When tubes V1 and V2 are conducting their maximum plate current through winding L1, the magnetic field in transformer T1, due to L1, ceases to increase. For an instant, there will be no induced voltage in winding L1, and because no charging potential is now appearing across winding L2, capacitor C2 begins to discharge. The discharge of capacitor C2 through resistor R7 causes the control grid of V2 to become less positive thereby causing this tube to conduct less plate current. As the plate current through winding L1 decreases, the magnetic field surrounding this winding starts to collapse. The collapsing field, in turn, induces a voltage in winding L2 such that the dot ending of L2 is negative. Accordingly, the control grid of tube V2 becomes more and more negative as the field surrounding L1 collapses. This process continues until the control grid of V2 is driven beyond the cut-off potential. Tube V2 will now remain cut off until such time as capacitor C2 has discharged to a sufficiently low level. When the voltage appearing across C2 has decreased below the value of the cut-off potential of V2, this tube will begin to conduct plate current whereupon the process described above will be repeated due to the increasing current flowing through L1.

It is apparent that if a second input pulse is not applied to terminals 10 and 11, the blocking oscillator will free run at a repetition frequency determined primarily by the values of resistor R7 and capacitor C2. However, if the repetition frequency of the train of pulses applied to input terminals 10 and 11 is greater than the free running or inherent frequency of the blocking oscillator, the frequency of operation of the oscillator will be controlled by the pulses applied to the input terminals 10 and 11. In other words, before the voltage appearing across capacitor C2 has decreased to a sufficiently low level so as to cause tube V2 to become conductive again, another input pulse applied to terminals 10 and 11 will render the blocking oscillator operative.

The cathode load impedance of tube V2 includes resistor R44 and the transmission line 12 which may be a real or artificial transmission line. The cathode of V2 is connected through R44 to the input terminal 14 of the transmission line. The transmission line essentially constitutes two conductors one of which is connected to terminal 14, the other of which is connected to ground.

At the other extremity of the transmission line the conductor which is connected between terminals 14 and 15 is connected or shorted to ground.

The cathode of V2 is also connected to output terminal 16. Associated with the cathode of tube V2 and the output terminal 16 is a shunt capacitance $C_s$ which includes stray capacities, wiring capacities and input capacitances of any electrical circuit which may be connected to terminal 16.

Figures 2, 3:
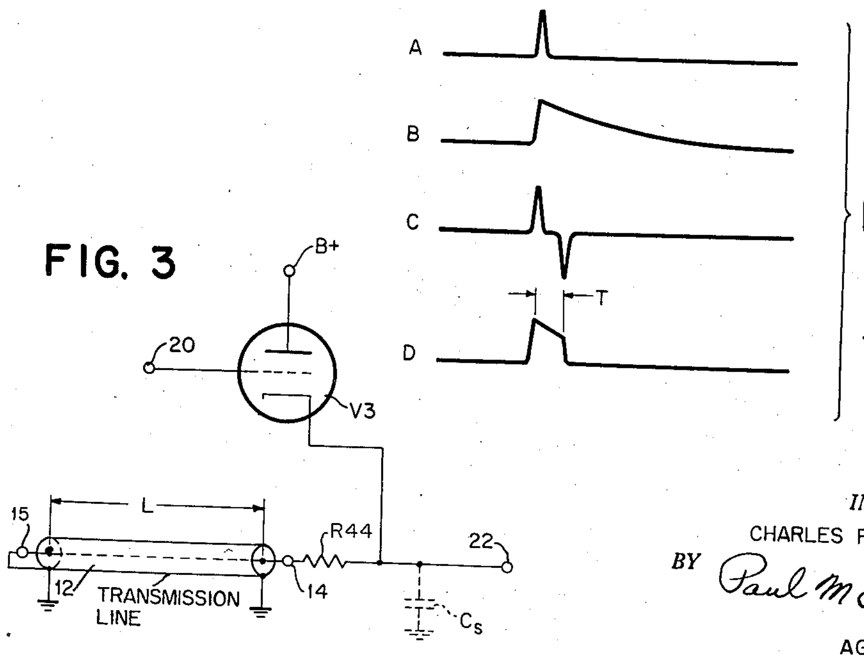
Fig. 2 is an idealized representation of the waveforms associated with the invention.
Fig. 3 is a circuit diagram of a novel cathode follower.

It is well known in the art of blocking oscillators, that the output pulse obtained from a blocking oscillator should appear as illustrated by the idealized waveform A of Fig. 2. However, in certain circuit applications where the value of the shunt capacitance $C_s$ of Fig. 1 is high, the output pulse produced by the blocking oscillator causes this capacitance to be charged. The shunt capacitance $C_s$ will then discharge as shown by waveform B of Fig. 2. It is apparent that the long sloping trailing edge of waveform B may be undesirable where the particular circuit requirements stipulate that the pulse obtained from the blocking oscillator have a relatively steep leading and trailing edge. This disadvantage is overcome in the circuit of Fig. 1 through the use of the transmission line 12.

With respect to the transmission line 12 of Fig. 1, consider that a sharp positive pulse such as shown by waveform A of Fig. 2 is applied to terminal 14 thereof. The positive pulse travels the length of the transmission line and upon reaching the shorted end thereof is inverted and travels back through the transmission line to terminal 14 where it arrives at a time T after the original pulse was applied to the line. If the time T is sufficiently long, the waveform present at terminal 14 would appear as shown by waveform C of Fig. 2. The time T required for a pulse to travel down and back the transmission line is determined by the physical characteristics of the transmission line as will be explained hereinafter.

Consider now the practical situation where the transmission line is connected as shown in Fig. 1 to the cathode of tube V2 and to the output terminal 16. The application of a positive pulse to terminals 10 and 11 will render the blocking oscillator operative so that a positive pulse will appear at the cathode of tube V2. This pulse is applied to terminal 14 of the transmission line and also causes the shunt capacitance $C_s$ to be charged. The pulse applied to the transmission line travels down the line to the shorted terminus and returns to terminal 14 as an inverted pulse at a later time T. The inverted pulse emerging from the transmission line causes the shunt capacitance $C_s$ to be discharged and thereby causes the signal appearing on terminal 16 to have a relatively steep trailing edge. The waveform appearing on terminal 16 under these conditions is indicated as waveform D of Fig. 2. With respect to this waveform, it will be noted that during the time interval T the shunt capacitance $C_s$ begins to discharge. However, it is the inverted pulse emerging from the transmission line which causes shunt capacitance $C_s$ to be discharged very rapidly so as to create a sharp trailing edge on the waveform appearing on terminal 16.

It will be noted hereinafter that the time T is primarily a function of the length of the transmission line. Thus if it is desired to obtain a positive pulse on terminal 16 similar to waveform A of Fig. 2, the length of the transmission line can be made sufficiently short such that the pulse of waveform D of Fig. 2 will have a width comparable to the width of waveform A.

The purpose of resistor R44 of Fig. 1 is to dissipate a sufficient amount of the pulse applied to the transmission line and similarly to dissipate a sufficient amount of the pulse received from the transmission line so as to only discharge the shunt capacitance $C_s$ to the reference level as shown in waveform D of Fig. 2. That is, the use of this resistor prevents the output pulse as illustrated in waveform D of Fig. 2 from becoming more negative than the reference level shown.

As stated above, the length of the transmission line used in the circuit of Fig. 1 is determined by the width of the output pulse desired. The length of the line in meters is determined from the following formula:

$$l=\frac{AT\alpha}{2}\text{meters}$$

where $\alpha$ is the propagation constant of the transmission line, T is the time between the direct and the reflected pulse in microseconds, and A is a constant equal to approximately 300 meters/microseconds. If for example, the time T is to be one twentieth of a microsecond and the transmission line is a section of coaxial cable wherein $\alpha$ is equal to approximately 0.85, the transmission line must be approximately twenty feet long.

Referring to Fig. 3, a second embodiment is illustrated wherein a shorted transmission line is used in conjunction with a cathode follower circuit. Input pulses which are applied to input terminal 20 control the conduction of tube V3 so that a similar pulse appears at the cathode thereof. In Fig. 3, the cathode of tube V3 is connected to the output terminal 22 and also through resistor R44 to the input terminal 14 of the transmission line 12. The transmission line in combination with resistor R44 comprises the cathode load impedance of the cathode follower V3. A shunt capacitance $C_s$ is illustrated as being connected between the cathode of tube V3 and ground. Accordingly, the leading edge of a positive pulse applied to terminal 20 causes the conduction of tube V3 to be increased whereupon a positive signal is applied to terminal 14 of the transmission line and also charges shunt capacitance $C_s$. The leading edge of this signal travels down the transmission line 12 to the shorted end thereof and returns at a later time it discharges the shunt capacitance $C_s$. Here again the purpose of resistor R44 is to dissipate so much of the pulse applied to and received from the transmission line so as to only discharge shunt capacitance $C_s$ to the reference level as shown in waveform D of Fig. 2. Thus it is apparent that the technique applied to the circuit of Fig. 1 may also be applied to conventional cathode follower circuits in the manner described above with respect to Fig. 3

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claim.

What is claimed is:

A blocking oscillator for providing a sharply cut off pulse to a capacitive load, comprising a triggering electron discharge device having an anode circuit including a pulse transformer winding connected therein, said triggering electron discharge device including input control connections for triggering operation thereof in response to an input pulse, a second electron discharge device having common anode circuit connections to said pulse transformer winding, said second electron discharge device including a control grid connected in circuit with another winding of said pulse transformer for controlling output pulse formation, said second discharge device also including a cathode connected in a cathode follower circuit consisting of a serial impedance connection from said cathode through a resistance and the input terminals of a short-circuit-terminated transmission line to ground, output circuit terminals connected across said entire serial impedance connection, said transmission line having a delay time equal to one half the desired output pulse duration time, said resistance of said serial impedance connection having a value sufficient to prevent any substantial negative excursion in the net potential at said cathode as a result of the inverted signal reflected by said transmission line.

References Cited in the file of this patent

UNITED STATES PATENTS

| | | |
|---|---|---|
| 2,188,970 | Wilson | Feb. 6, 1940 |
| 2,212,173 | Wheeler | Aug. 20, 1940 |
| 2,212,420 | Harnett | Aug. 20, 1940 |
| 2,265,996 | Blumlein | Dec. 16, 1941 |
| 2,266,154 | Blumlein | Dec. 16, 1941 |
| 2,433,379 | Levey et al. | Dec. 30, 1947 |
| 2,461,110 | Fischman | Feb. 8, 1949 |
| 2,472,209 | Hall | June 7, 1949 |
| 2,531,164 | Sands et al. | Nov. 21, 1950 |
| 2,543,431 | Bess | Feb. 27, 1951 |
| 2,546,371 | Peterson | Mar. 27, 1951 |
| 2,567,239 | Sheretz | Sept. 11, 1951 |
| 2,623,106 | Fassberg | Dec. 23, 1952 |
| 2,682,657 | Howorth | June 29, 1954 |
| 2,720,591 | Hupert | Oct. 11, 1955 |
| 2,740,109 | Okrent | Mar. 27, 1956 |